United States Patent [19]

Rumreich

[11] Patent Number: 4,974,087
[45] Date of Patent: Nov. 27, 1990

[54] PARALLEL SOUND IF WITH REFERENCE CARRIER DERIVED FROM QUASI-SYNCHRONOUS VIDEO DETECTOR

[75] Inventor: Mark F. Rumreich, Indianapolis, Ind.
[73] Assignee: RCA Licensing Corporation, Princeton, N.J.
[21] Appl. No.: 337,710
[22] Filed: Apr. 13, 1989
[51] Int. Cl.⁵ .................... H04N 5/60; H04N 5/52
[52] U.S. Cl. .................................. 358/198; 358/174
[58] Field of Search ............... 358/188, 197, 198, 174

[56] References Cited

U.S. PATENT DOCUMENTS

| | | | |
|---|---|---|---|
| 4,199,787 | 4/1980 | Craft | 358/197 |
| 4,237,485 | 12/1980 | Saito et al. | 358/197 |
| 4,263,611 | 4/1981 | Gibson et al. | 358/23 |
| 4,353,093 | 10/1982 | Durbin, Jr. et al. | 358/160 |
| 4,470,070 | 9/1984 | Griffis | 358/198 |
| 4,513,323 | 4/1985 | Patel | 358/197 |
| 4,514,763 | 4/1985 | Rindal | 358/167 |
| 4,551,756 | 11/1985 | Ogawa | 358/197 |
| 4,602,288 | 7/1986 | Everett | 358/197 |
| 4,630,119 | 12/1986 | Okuno | 358/198 |
| 4,639,786 | 1/1987 | Tamer et al. | 358/197 |
| 4,660,088 | 4/1987 | Lagoni et al. | 358/198 |
| 4,692,803 | 9/1987 | Tobita | 358/198 |
| 4,716,464 | 12/1987 | Parker | 358/197 |
| 4,718,086 | 1/1988 | Rumreich et al. | 358/198 |
| 4,742,293 | 5/1988 | Sugai | 358/188 |

OTHER PUBLICATIONS

Television Gijutsu Issue of Sep. 1985, pp. 49-55, along with English language translation.

Primary Examiner—Tommy P. Chin
Attorney, Agent, or Firm—Joseph S. Tripoli; Peter M. Emanuel; Frederick A. Wein

[57] ABSTRACT

The present invention is for a low buzz television signal processing system. The picture signal is detected by a quasi-synchronous detector wherein the picture carrier is amplitude limited and video tank filtered for insertion into the video mixer for deriving the composite video signal. The sound channel comprises a single parallel resonant tuned circuit forming a bandpass filter with a passband centered at the sound carrier frequency. The modulated sound carrier is fed to a sound detector which is also fed the same filtered picture carrier signal provided by the video tank for providing the 4.5 MHz intercarrier sound signal.

18 Claims, 3 Drawing Sheets

PARALLEL SOUND IF WITH REFERENCE CARRIER DERIVED FROM QUASI-SYNCHRONOUS VIDEO DETECTOR

The sound transmission accompanying TV picture transmission in, for example, the NTSC system used in the United States, is a frequency modulated (FM) signal transmitted 4.5 MHz above the radio frequency (RF) picture carrier. As used herein and in the claims, the term television receiver is intended to include all appropriate apparatus whether or not a display device is provided, e.g., television sets and VCRs. In a typical TV receiver, the picture and sound signals are processed together through the RF stage and the mixer (sometimes called the first detector). Typically, modern TV receivers are superheterodynes using a local oscillator frequency tuned above the receiving frequency. As a result, the sound and picture carrier signals appear transposed in the intermediate (IF) section, i.e., the sound carrier frequency appears 4.5 MHz below the picture carrier frequency. The IF frequency used in the United States is effectively standardized and results in the IF picture and IF sound carrier signals being 45.75 MHz and 41.25 MHz, respectively.

A number of alternatives have been employed for further processing the IF signal provided by the mixer. In the conventional intercarrier system commonly used in monophonic television receivers, the picture and sound carriers are processed after the tuner in a common IF channel. The picture information is amplitude modulated on the picture carrier and is detected by an envelope or synchronous detector, and thereafter is processed in a video channel. To recover the frequency modulated audio information, the two IF carriers are mixed to form an intercarrier sound signal having a frequency corresponding to the difference of the carrier IF frequencies, e.g., for the NTSC system a 45.75 MHz picture carrier is mixed with a 41.25 MHz sound carrier for producing a 4.5 MHz intercarrier sound signal. The frequency modulated (FM) intercarrier sound signal is subsequently demodulated by an FM detector to produce the audio information.

However, the intercarrier system is subject to the introduction of interference and noise in the 4.5 MHz sound carrier signal which may cause distortion or other defects in the sound. Some forms of such interference are caused by modulations of the picture carrier signal when it is mixed with the sound carrier signal. For example, as is known, the overall transmission characteristics of the picture IF for TV receivers are designed for vestigial sideband modulation of the picture carrier at the transmitter. The characteristic of a typical receiver exhibit an approximately linear attenuation slope (sometimes called the "Nyquist slope") over a ±750 KHz double sideband (DSB) region (U.S. standards), with the picture carrier frequency located at the midpoint of the slope (−6 dB relative to the single sideband portion). As a result, the sideband signals, which occur in symmetrical pairs in the DSB portion, are asymmetrically attenuated by the Nyquist slope portion of the transmission characteristic. A known effect of this sideband asymmetry is to produce an undesirable phenomenon known as incidental carrier phase modulation (ICPM) in the picture carrier signal which may result in the reproduced sound signal being effected by an objectionable "buzz".

Other ICPM distortion can result from a number of sources all of which have the effect of imparting undesired video frequency phase modulation onto the picture carrier, which phase modulation is subsequently transferred to the 4.5 MHz intercarrier sound signal in the receiver. The phase modulation so transferred to the 4.5 MHz intercarrier sound signal also results in "buzz" distortion of the reproduced sound signal for phase modulation frequencies.

Some causes of sound buzz are:

(1) Nyquist slope: As stated above, the Nyquist slope in the IF surface acoustic wave filter (SAW) or other appropriate filter causes an asymmetry between the upper and lower sidebands of the picture carrier. This process converts the amplitude modulation (AM) of the picture carrier to a phase modulation (PM), which is directly transferred to the 4.5 MHz audio subcarrier and demodulated as FM.

(2) Video Harmonics at 4.5 MHz: Because the typical distortion of the video detector is 10%, harmonics of 1.5 MHz and 2.25 MHz video components can be appreciable at 4.5 MHz. Intermodulation will also create products near 4.5 MHz such as the beat frequencies between chroma and video information at 920 KHz.

(3) AM ReJection of sound IF (SIF): Imperfect limiting of the picture carrier results in video related amplitude modulation (AM) on 4.5 MHz. A second cause of 4.5 MHz AM is intermodulation between video and 4.5 MHz in systems where 4.5 MHz is derived from the video output. AM on 4.5 MHz results in buzz because of limited AM rejection (AMR) of the SIF. The AMR of the SIF is a function of frequency and a strong function of 4.5 MHz amplitude.

(4) Chroma into SIF: Chroma buzz results when the level of 3.58 MHz color burst with respect to 4.5 MHz into the SIF exceeds some threshold. High pix/sound signals with high amounts of chroma will aggravate this problem.

(5) Deflection Pickup: Buzz is introduced because the carrier of the stereo signal and the secondary audio program (SAP) are exact multiples (2 times and 5 times respectively) of the horizontal sweep rate.

Multichannel audio for stereo and bi-lingual broadcasting involves the use of one or more audio subcarriers for forming a composite audio signal. The composite signal requires that the television audio signal bandwidth be increased to approximately 90 kHz or more as compared with the 15 kHz bandwidth for a monophonic audio program. As a result, the bandwidth of the sound processing channel of the stereophonic television receiver must be increased and audio buzz produced in the sound signal processing channel tends to be more severe. Additionally, the sound detectors are more susceptible to interference at high frequencies and thus intercarrier buzz causes even more serious interference in the reception of stereophonic (stereo) and Second Audio Program (SAP) transmissions particularly those using subcarrier frequencies (in the U.S.) of twice and five times the horizontal sweep rate (31,468 kHz and 78.67 kHz), respectively.

Alternative sound separation systems have been employed to overcome what was thought to be the "Nyquist" buzz problem, e.g., the "split-carrier sound" and "quasi-parallel sound" systems In split-carrier sound, after the tuner, the picture carrier signal is processed separately from the sound carrier signal for deriving the video information. The intercarrier method is maintained with the sound detection provided by a phase locked loop (PLL) providing a spectrally pure sine wave of the same frequency and phase of the picture carrier. However, the PLL is expensive to implement and the circuit requires additional amplifiers and tuned circuits as well as a more expensive chip. In this system the sound channel does not process the picture carrier at all and thus the audio buzz due to Nyquist ICPM as well as the other causes of buzz is greatly reduced compared to the monaural intercarrier system.

In the so-called "quasi-parallel" system sound and video signals are separately amplified and demodulated in different channels. In the sound channel the picture IF carrier is additionally separately processed and mixed with the sound IF carrier signal to form a 4.5 MHz intercarrier sound signal. The intercarrier sound signal is subsequently demodulated to produce an audio signal which, after processing, is ultimately conveyed to a sound reproducing loudspeaker.

In the quasi-parallel system, the sound channel includes filter(s) which receive the sound and picture carriers prior to demodulation. The sound channel filter provides an input to a sound demodulating system which is substantially symmetrical with respect to both the sound and picture carrier frequencies as required to produce a properly demodulated sound signal without subjecting the parallel picture carrier to phase distorting Nyquist slope processing which is required for the proper demodulation of the vestigial sideband video information. Additional circuitry such as amplifiers and tuned circuits are also required.

In both of the alternate systems, SAW filters are often used. The SAW filter offers advantages in terms of small size, and reproducible performance without need of alignment. SAW filters are available as dual channel devices as well as individual video IF and sound IF SAW filter channels, and as such are particularly useful in receivers employing the quasi-parallel IF principle. However, the SAW filters have very large insertion losses (more than 20 db) and in addition to being a relatively high cost component, often require additional preamplifier stages to make up the insertion losses of the SAW filter.

Additionally, a phase locked loop (PLL) synchronous detector used as the video detector produces a pure sine wave in phase lock with the picture carrier for deriving the 4.5 MHz intercarrier sound signal independent of ICPM effects. The PLL requires additional "OFF" chip components as well as a relatively expensive integrated circuit chip.

Accordingly, it is desirable to provide a high quality wide band audio signal free of buzz which is economical to produce and does not require the use of relatively expensive chips, or dual channel SAW filters or SAW filters in the sound channel.

SUMMARY OF THE INVENTION

Briefly, the present invention is for a low buzz television signal processing system wherein the video signal is processed by IF stages and detected by a quasi-synchronous detector wherein the picture carrier is amplitude limited and filtered for insertion into the video mixer for deriving the composite video signal. The sound channel comprises a single parallel resonant tuned circuit forming a bandpass filter with a passband at the sound carrier frequency The modulated sound carrier is fed to a sound detector which is also fed the same filtered picture carrier signal used in the video detector for providing the 4.5 MHz intercarrier sound signal. The present circuit permits production of a wideband stereophonic signal without resort to a phase locked loop and without requiring a surface acoustic wave (SAW) device for IF sound processing.

DESCRIPTION OF THE DRAWINGS

For a better understanding of the present invention, reference may be had to the accompanying drawings wherein.

DETAILED DESCRIPTION OF PREFERRED EMBODIMENT

Figure 1:
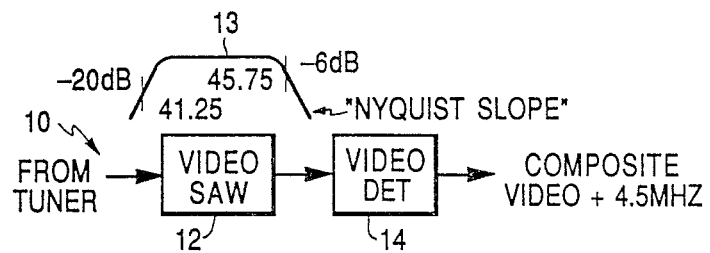
FIGS. 1-4 show block diagrams of prior art configurations for deriving intercarrier sound signals in television sets.

FIG. 1 shows a prior art monophonic system including the processing of the sound intercarrier signal wherein because of the limited frequency response required for such monophonic system, "buzz" is tolerable and ICPM caused by the "Nyquist slope" and other ICPM causes were easily controllable. The IF signal is provided from a tuner 10 and fed to a video SAW 12 or other appropriate intermediate frequency bandpass amplifier having a typical bandpass characteristic 13 as shown, and fed to a video detector 14 wherein the video carrier is mixed with the sound carrier for providing a video composite signal and a sound intercarrier signal.

Figure 2:
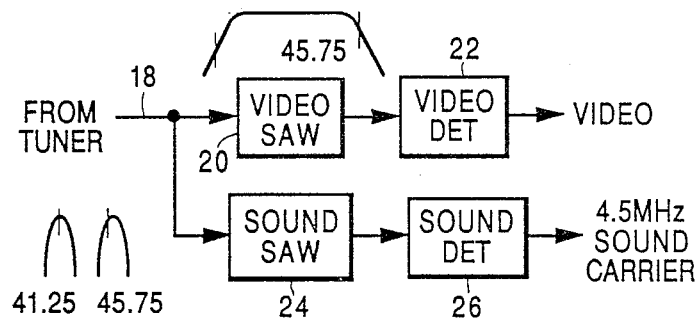

FIG. 2 shows one of a so called quasi-parallel sound system wherein the IF signal from a tuner at 18 is fed to a video SAW 20 having a standard video bandpass characteristic and then fed to a video detector 22 for detection of the video signal. In order to avoid ICPM, the sound is processed by a sound SAW 24 having symmetric bandpass peaks at each of the sound carrier frequency and the video carrier frequency. In this manner, the parallel sound channel separately amplifies bandpass signals at the sound carrier and the picture carrier frequencies in order to prevent Nyquist slope and other carrier problems from being introduced into either of the carriers in the sound channel as would otherwise be required in order to properly process the video signal. The two symmetric carriers are then mixed in the sound detector 26 for deriving the 4.5 MHz intercarrier sound signal.

Another approach to providing a buzz acceptable sound is provided with the phase locked loop (PLL) which provides a video carrier which is stable and fairly independent of video carrier modulation or other processing of the video carrier and also provides a carrier signal which is frequency pure inasmuch as it is derived from a voltage controlled oscillator, the frequency and phase of which is adjusted as detected by a phase detector. In this manner, the phase locked loop permits mixing of a clean and frequency stable video carrier fairly independent of any modulation or phase effects due to the Nyquist slope or other video modulations of the video carrier. In this regard, referring now to FIG. 3, video SAW 28 filters the IF signal derived from tuner 29 in the conventional Nyquist slope passband 30 required for processing of the video channel and such signal is fed to the phase locked loop synchronous video detector 31 wherein the composite video and the sound intercarrier are derived reasonably independent of ICPM and video modulations of the video carrier.

Figure 4:
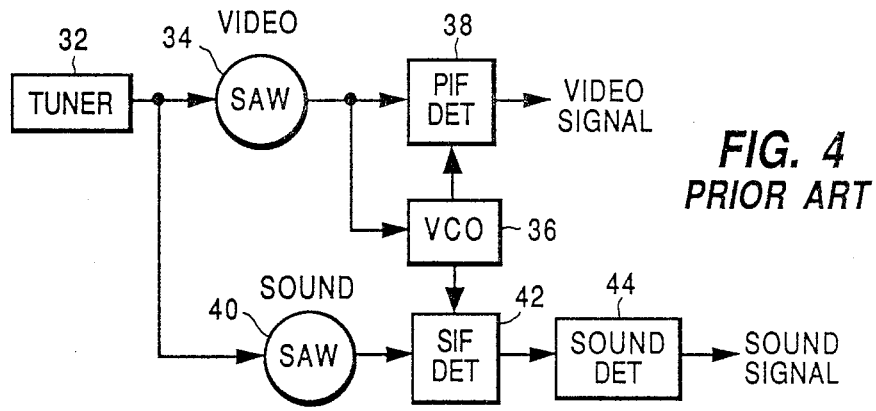

Yet another example of the prior art using a PLL is shown in FIG. 4 wherein the IF signal derived from tuner 32 is processed by a video SAW 34 in a conventional manner and detected by a synchronous detector 38 using the output of a PLL voltage controlled oscillator (VCO) 36 fed to picture video detector 38 for deriving the detected composite video signal. The output of VCO 36 is also fed to the sound detector 42 which when mixed with the modulated sound carrier from sound SAW 40 produces the 4.5 MHz intercarrier signal which is detected at sound detector 44.

Thus in summary, the prior art of FIGS. 1 through 4 shows that it was deemed necessary in the prior art in order to provide a wide band sound signal reasonably free of buzz that either a PLL (synchronous detector) be used in the video detector for detecting the video signal as well as deriving the 4.5 MHz intercarrier signal, or that the sound signal be separately amplified using a SAW filter with or without an accompanying SAW filtering of a parallel video carrier with a corresponding detection for generating the 4.5 MHz sound carrier.

Figure 3:
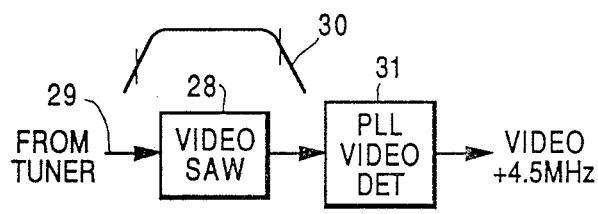

Thus, substantial efforts have been made to reduce the so called "Nyquist Slope" buzz generation problem, such circuits being shown in FIGS. 2 through 4 have been used. However, the Nyquist slope generated buzz once believed to be the dominant problem for stereo sound buzz has been shown by the use of the single channel PLL design with wide loop band width and Nyquist SAWS as shown in FIG. 3 not to be the dominant problem. Accordingly, it is possible as disclosed herein, to produce an acceptably low level buzz free stereo signal using more economical circuitry, e. g., sound IF filters other than a SAW filter which is a relative expensive part having high insertion losses, and other than a phase locked loop (synchronous) detector which requires relatively extensive external chip circuitry and/or a more expensive monolithic chip. Thus, for commercial purposes in a highly competitive television industry, substantial economic benefits can be derived wherein while still providing a high quality stereo signal.

Figure 5:
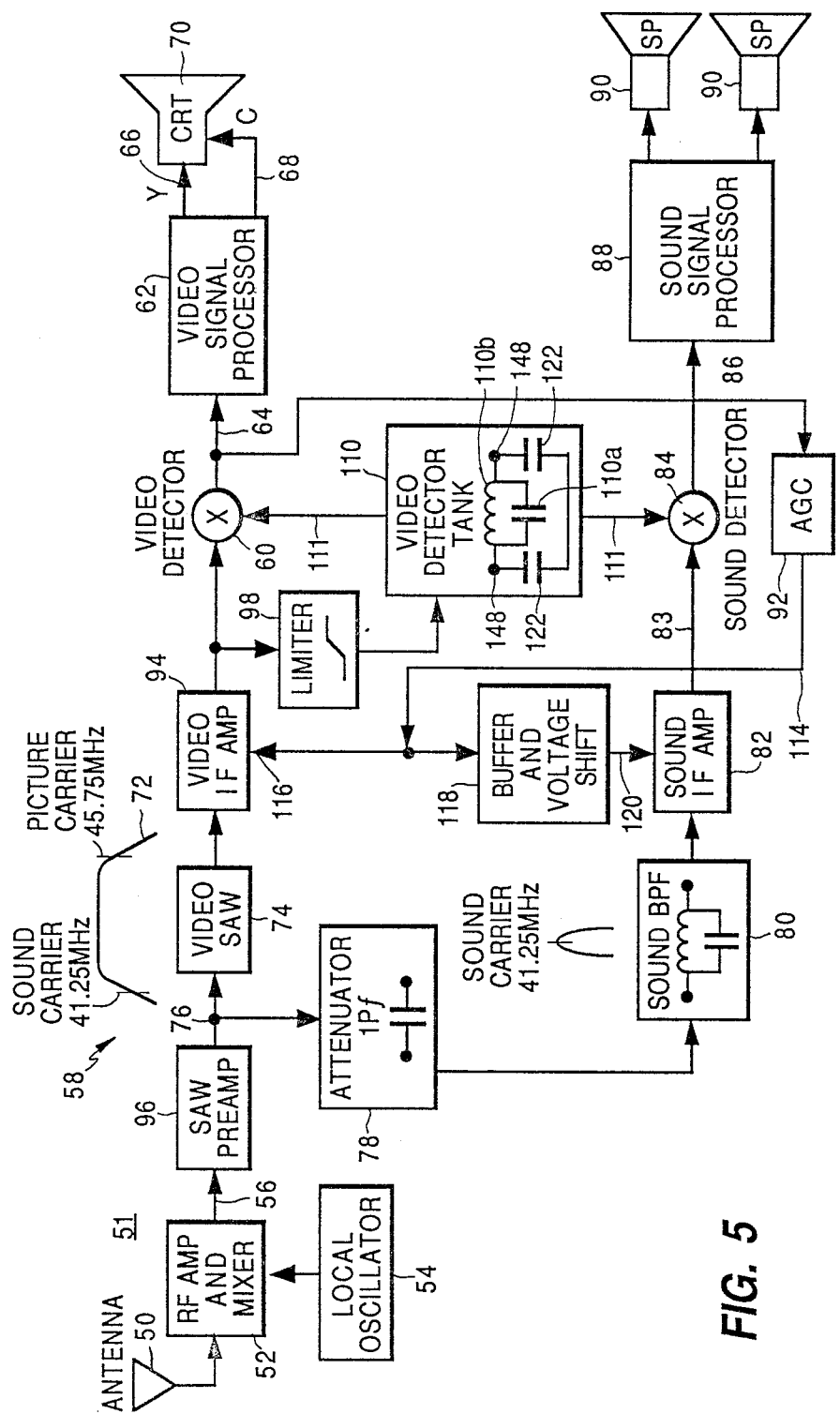
FIG. 5 shows a block diagram including aspects of the present invention.

Referring now to FIG. 5 wherein the tuner, IF, detector and AGC circuits are provided on a TA7777 integrated circuit manufactured by Toshiba Corporation of Japan, a television broadcast signal received by an antenna 50 is applied to a television tuner 51 which comprises an RF amplifier and mixer 52 in combination with a local oscillator 54. Tuner 51 selectively translates the RF picture and sound carrier signals of a selected TV channel to intermediate frequency (IF) carriers at, e. g., 45.75 MHz and 41.25 MHz, respectively for the NTSC system used in the United States.

Generally, conventional color television signal processing circuitry includes IF filtering and amplifying, generally designated 58, a video detector 60 and a video signal processor 62 responsive to the composite video signal at 64 and in a television set for providing a luminance signal at 66 and appropriate color signals at 68 to a kinescope or CRT 70 along with appropriate deflection synchronization.

IF video channel 58 has a convention passband response 72 as provided by the video SAW 74 external of the chip wherein the picture carrier is located 6 db down on the higher frequency slope and the IF sound carrier is located approximately 20 db down on the lower frequency slope so that the vestigial sideband video information can be detected without significant interference from the IF sound carrier. This is the response which is required to properly process the video information and thus the IF passband response 72 introduces as discussed hereinabove, a "Nyquist incidental carrier phase modulation" to the IF picture carrier due to the asymmetrical attentuation of the side bands of the IF picture carrier.

In accord with aspects of the present invention and generally speaking, the IF sound carrier available at terminal 76 is fed to an chip external attenuator 78 and then to chip external sound bypass filter 80 with the sound carrier being symmetrically bandpassed filtered at the sound carrier frequency of 41.25 MHz. The sound IF signal amplified at 82 is detected at sound detector 84 for producing a 4.5 MHz intercarrier sound signal at 86 which, in a television set, is then fed to sound signal processor 88 for amplifying and decoding the sterophonic sound and feeding said audio sound to loudspeakers 90. Sound bandpass filter 80 has a symmetrical single tuned resonant circuit with a bandwidth of 1 MHz centered at the IF sound carrier frequency of 41.25 MHz in the NTSC system for passing substantially only the IF sound carrier signal and its immediate modulation sidebands.

Additionally, a conventional automatic gain control circuit (AGC) 92 is responsive to the video signal at 64 for controlling the gain of video IF amplifier 94 and sound IF amplifier 82 so as to establish signal levels at predetermined levels.

More particularly, the IF signal having a picture carrier and a sound carrier modulated with video and audio information respectively at 56 is amplified by SAW preamp 94 which typically provides anywhere from 20 to 26 db amplification to compensate for the large insertion loss of a SAW filter which typically is around 20 db. The amplified IF signal at 76 is then passed through SAW filter 74 having a 6 MHz bandpass characteristic with appropriate skirts as shown in 72 for processing of video signal as required by the NTSC system. The signal from video SAW 74 is then fed to video IF amplifier 94 which is a conventional gain controllable amplifier for amplification of video signal as well as having a terminal 116 for AGC gain control. The picture signal is then fed to video detector 60 which is a commonly used multiplier and is disxussed more fully hereinafter.

The type of detection used herein is what is commonly called quasi-synchronous or pseudo-synchronous wherein the picture carrier is amplitude limited at 98 to remove any envelope modulation present on the carrier. The output of limiter 98 is then fed to chip external video detector tank 110 which is a reasonably narrow tuned tank circuit for preserving the fundamental frequency of the previously limited picture carrier signal while substantially attenuating harmonics of the fundamental carrier frequency. The output 111 of tank circuit 110 is fed to video detector 60 wherein it is mixed with the picture carrier modulated with video information for providing the composite video signal at 64.

The sound carrier portion of the IF signal at 76 is passed through chip external attenuator 78 in a manner and for a purposed which will be explained more fully herinafter, and then fed to bandpass filter 80. Bandpass filter 80 is a single parallel resonant circuit having a center frequency of 41.25 MHz with a bandpass of approximately 1 MHz for providing sufficient bandpass of the sound modulation. It has been found that a tuned single parallel resonant circuit is sufficient for this purpose. However, both a single tuned on double tuned resonant circuit can be used, in either case without resort to a sound SAW filter.

The filtered sound carrier with audio modulation is then fed to a sound IF amplifier 82 having a gain controllable AGC input terminal 120 and then fed to sound detector 84 which is a multiplier circuit common in the art and similar to the multiplier of video detector 60.

It has been found that the limited and filtered picture carrier provides sufficient quality of detected sound without resort to a PLL and as such, the same picture carrier signal available at 111 provided by video tank circuit 110 is also fed to sound detector 84 for mixing with the sound carrier. The output of sound detector 84 is a 4.5 MHz intercarrier sound signal available at 86 which is then processed by sound signal processor 88.

Thus, the same processed picture carrier signal 111, e.g., limited, filtered and fed to the video detector 60, is also fed to sound detector 84. In this manner the video detector tank 110 is AC coupled to and common with sound detector 84 which is contrary to prior art which required a different tank circuit for the sound detector. In the exemplary embodiment, tank 110 is directly coupled to sound detector 60 and is AC coupled by capacitors 122 to video detector 84 so that the biases of detectors 60 and 84 will not be intercoupled. Capacitors 122 are essentially a short circuit at the signal frequencies of interest.

The AC coupling of the sound detector 84 with the video detector 60 also permits introduction of the modulated sound carrier into video detector 60 since capacitors 122 provide a reciprocal coupling. In this regard, two additional circuit features are used to prevent any degradation of the video composite signal by the modulated sound carrier.

Attenuator 78 is used to loosely couple or attenuate the sound carrier level and in the exemplary embodiment is a one picofarad capacitor coupling to bandpass filter 80. Other attenuation systems can be used, e.g. resistors, resistor dividers, inductors, inductor dividers, capacitor dividers, etc. In this manner, the sound signal level fed to the video detector 60 via detector 84 is substantially reduced. Additionally in this regard, AGC circuit 92 is coupled to and responsive to the composite video signal at 64 and particularly, the synchronization tips thereof. AGC circuit 92 is a commonly used circuit with the output 114 coupled to video control terminal 116 for controlling the gain of video amplifier 94. Additionally, to keep the desired low ratio of picture IF signal to sound IF signal at video detector 60, the gain of the sound IF is kept in step with and follows the AGC control of the video. To accomplish this, chip external buffer and voltage shift 118 couples AGC circuit 92 to sound IF amplifier 82 at the gain controllable terminal 120. Additionally, in order to further reduce the gain of the sound IF and hence, the sound carrier fed to video detector 60, the AGC voltage at sound gain control terminal 120 is reduced in buffer and voltage shift 118 by 0.3 volts which in the exemplary embodiment corresponds to a further 10 db reduction of amplification of the sound IF signal fed to detector 84. Thus, the picture AGC not only adjusts the gain of the picture IF, but also adjusts the gain of the sound IF.

Figure 6:
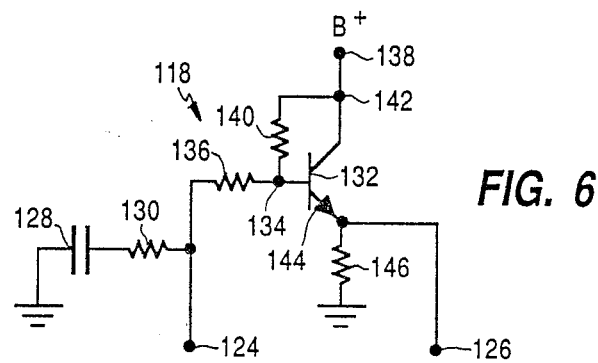
FIG. 6 is a schematic diagram of the buffer and voltage shift of FIG. 5.

FIG. 6 shows the chip external buffer and voltage shift 118 of FIG. 5. Terminal 124 is a chip terminal provided for coupling of a picture AGC filter to AGC lead 114 of FIG. 5. Capacitor 128 and resistor 130 are a standard AGC filter coupled between terminal 124 and ground. Terminal 126 is a chip terminal provided for coupling a sound AGC filter to AGC lead 120 of FIG. 5. Instead of an AGC filter at terminal 126, in the exemplary embodiment a buffer and voltage shift 118 is provided. An NPN transistor 132 has a base 134 coupled to terminal 124 through resistor 136 and coupled to voltage source 138 through resistor 140. Collector 142 is also connected to voltage source 138. Emitter 144 is coupled to ground through resistor 146 and to terminal 126.

The chip internal sound AGC circuit (not shown) was intended to provide sound AGC voltage at pin 126 for filtering. However, as shown in FIG. 5, there is no video composite present at terminal 86 since no video modulation is fed to sound detector 84, i.e., sound bandpass filter 80 filters out picture carrier and video modulation thereof, and the picture carrier at 111 is limited and filtered to remove video modulation. Hence there are no synchronization tips present 86 for the internal sound AGC circuit to be responsive to. Thus, other arrangements for AGC are provided.

Transistor 132 functioning as an emitter follower, DC couples the video AGC voltage at pin 124 to pin 126 which has a relatively high output impedance. Thus, an AGC voltage fed to terminal 126 from a relatively low impedance voltage source will dominate over an internally generated sound AGC voltage. The AGC voltage at 124, is filtered by capacitor 128 and resistor 130 and fed to the base 134 of transistor 132 through resistor 136. The output voltage of transistor 132 is present at emitter 144 and coupled to pin 126. Transistor 132 is biased by resistors 140 and 146 at +0.3 volts base to emitter (Vbe) but when the Vbe threshold of 0.6 volts (for silicon) is subtracted (the AGC voltage at terminal 124 plus 0.3 volts bias minus 0.6 volts threshold), the result is a reduction or voltage shift of -0.3 volts of the voltage value of the video AGC voltage present at terminal 124. Thus, the voltage at terminal 124 reduced or shifted and the amount of voltage reduction present at terminal 126 is determined by adjustment of the Vbe bias of transistor 132. This voltage shift of −0.3 volts corresponds to a reduction of gain in the sound IF gain controllable amplifier 82 of 10 db.

Thus, transistor 132 serves the dual purpose of a buffer (emitter follower) and a voltage shifter. In this manner, the amplitude of the modulated sound carrier present at detector 84 for injection into video detector 60 is further reduced by AGC reduction of the gain of the sound IF amplifier 82 as well as by attenuator 78.

Figure 7:
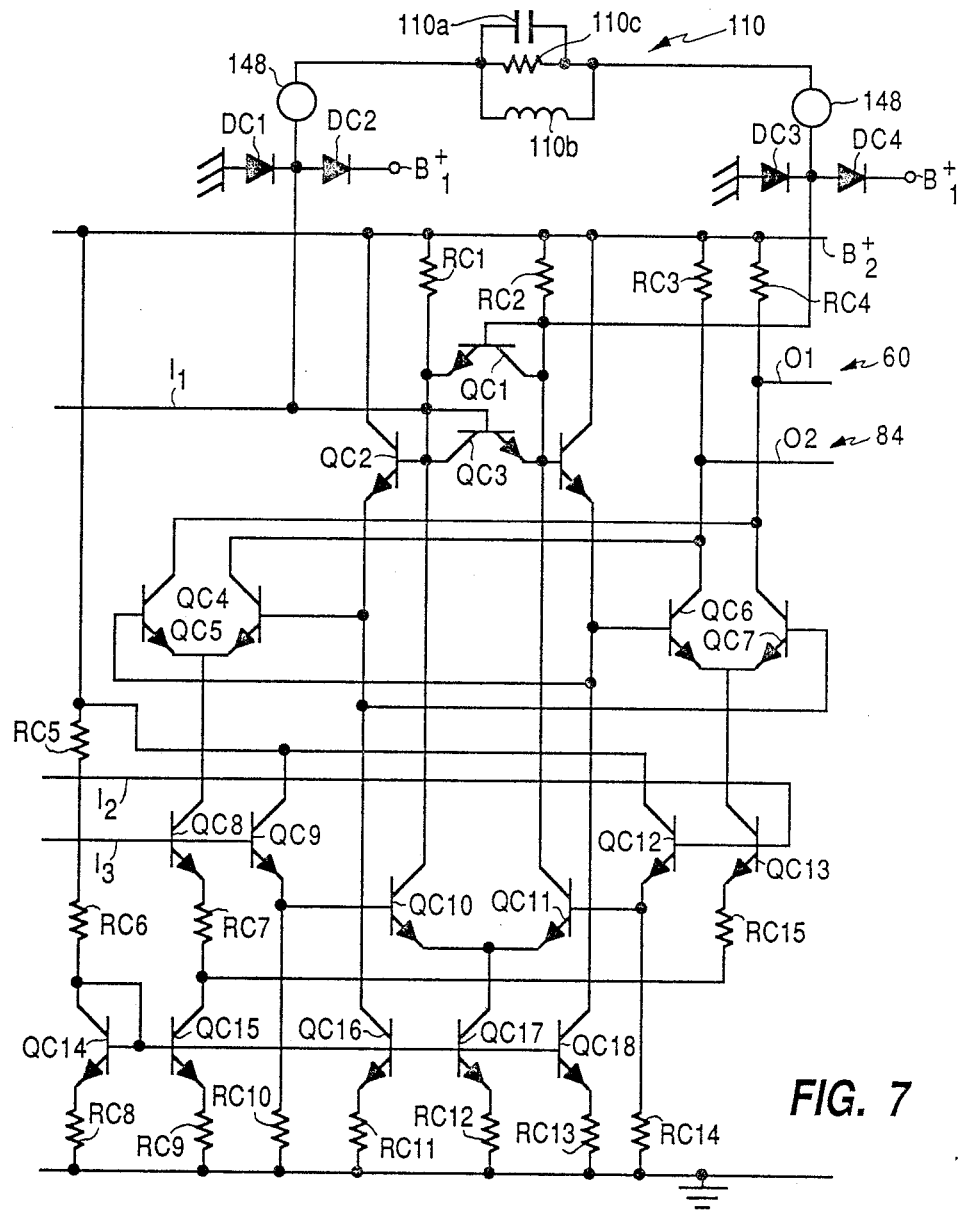
FIG. 7 is a schematic of the detector/ multipliers of FIG. 5.

Referring now to FIG. 7, there is shown a schematic of the detectors/multipliers 60 and 84 of FIG. 5. Tank circuit components capacitor 110a and inductance 110b are connected in parallel with each other and in turn are connected to integrated circuit multiplier 60 at terminals 148, and in a like manner are AC coupled to multiplier 84 through capacitors 122 (FIG. 5). Resistor 110c is optional and is connected across tank circuit capacitor 110a and inductance 110b if it is desirable to adjust the "Q" of tank circuit 110 such as to increase the bandwidth of tank circuit 110.

Multipliers 60, 84 are common four quadrant bipolar multipliers used in integrated circuits. Integrated circuit transistors QC1-18 and integrated circuit resistors RC1-15 are connected on the chip as shown. Voltage supply B+1 is connected through diodes DC1-4 to ground thus biasing tank circuit 110 as shown. Voltage supply B+2 provides power to the chip. Inputs to the multipliers 60, 84 are I1-3 and outputs are 01-2.

Thus it has been found that the quality of the sound can be sufficiently high without resort to both a sound SAW and a phase locked loop even when using a Nyquist Slope effected picture carrier for producing the 4.5 MHz sound intercarrier signal. In other words, it has been found to be technically feasible to use a sound bandpass filter comprising a single resonant tuned circuit 80 instead of a sound SAW filter, and using a quasi-synchronous detector for producing the intercarrier sound for 4.5 MHz instead of a phase locked loop. The present invention provides high quality high fidelity sound reasonably clear of buzz at reduced cost.

While there is illustrated as described what is at present considered to be preferred embodiment of the present invention, it will be appreciated that numerous changes and modifications are likely to occur to those skilled in the art and it is intended that the appended claims cover all such modifications that fall within the true spirit of the present invention.

I claim:

1. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

IF bandpass filter means for filtering said IF signal to produce a first filtered version of said picture carrier but still modulated by said video information, a video detector means having an input coupled to the IF bandpass filter means and including a video bandpass filter means for deriving a second filtered version of the picture carrier from said first filtered version of said picture carrier relatively free of said video modulation for producing in response to said first and second filtered versions of said picture carrier a detected video signal, a sound bandpass filter means for bandpass filtering the IF signal and deriving the sound carrier modulated with audio information, said sound bandpass filter consisting essentially of a single parallel resonant circuit tuned to the sound carrier frequency, and a sound detector means coupled to both the video detector means and the sound bandpass filter means for mixing the second filtered version of the picture carrier received from the video detector means and the sound carrier modulated with audio information received from the sound bandpass filter means, and providing an output signal comprising a sound intercarrier modulated with the audio information.

2. The television receiver of claim 1 wherein the single parallel resonant circuit of the sound bandpass filter is single tuned.

3. The television receiver of claim 1 wherein the video bandpass filter consists essentially of a parallel resonant circuit tuned to the picture carrier frequency.

4. The television receiver of claim 3 wherein the video bandpass filter is common to both the video detector means and the sound detector means.

5. The television receiver of claim 3 wherein the video detector means further comprises a limiter.

6. The television receiver of claim 4 wherein the video detector means further comprises a limiter.

7. The television receiver of claim 1 further comprising a picture gain controllable amplifier for amplifying the first filtered version of the picture carrier, a sound gain controllable amplifier for amplifying the sound carrier, and a picture AGC circuit responsive to the detected video signal, the gain of the picture gain controllable amplifier and the gain of the sound gain controllable amplifier both being adjustable by said picture AGC circuit.

8. The television receiver of claim 7 wherein the level of the IF signal fed to the sound bandpass filter is attenuated by a signal attenuation means.

9. The television receiver of claim 8 wherein the signal attenuation means is a capacitor for loosely coupling the IF signal to the sound bandpass filer.

10. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

IF bandpass filter means for filtering said IF signal to produce a first filtered version of said picture carrier but still modulated by said video information, a video detector means having an input coupled to the IF bandpass filter means and including a video bandpass filter means consisting essentially of a parallel resonant circuit tuned to the picture carrier frequency and a limiter for deriving a second filtered version of the picture carrier form the first filtered version of said picture carrier relatively free of said video modulation for producing in response to said first and second filtered versions of said picture carrier a detected video signal, a sound bandpass filter means for bandpass filtering the IF signal and deriving the sound carrier modulated with audio information, said sound bandpass filter means consisting essentially of a single parallel resonant circuit tuned to the sound carrier frequency, and a sound detector means coupled to both the video detector means and the sound bandpass filter means for mixing the second filtered version of the picture carrier received from the video detector means and the sound carrier modulated with audio information, received from the sound bandpass filter, and producing an output signal comprising a sound intercarrier modulated with the audio information, the video bandpass filter means being common to the video detector means and the sound detector means.

11. The television receiver of claim 10 further comprising a picture gain controllable amplifier for amplifying one of the IF signal and the first filtered version of the picture carrier, a sound gain controllable amplifier for amplifying the sound carrier, and a picture AGC circuit responsive to the detected video signal, the gains of both the picture gain controllable amplifier and the the sound gain controllable amplifier being adjustable by said picture AGC circuit.

12. The television receiver of claim 11 wherein the level of the IF signal fed to the sound bandpass filter is attenuated by a signal attenuation means.

13. The television receiver of claim 12 wherein the signal attenuation means is a capacitor for loosely coupling the IF signal to the sound bandpass filter.

14. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

IF bandpass filter means for filtering said IF signal to produce a first filtered version of said picture carrier but still modulated by said video information, a video detector means having an input coupled to the IF bandpass filter means and including a video bandpass filter means consisting essentially of a parallel resonant circuit tuned to the video carrier frequency and a limiter for deriving a second filtered version of the picture carrier from the first filtered version of said picture carrier relatively free of said video modulation for producing in response to said first and second filtered versions of said picture carrier a detected video signal.

a sound bandpass filter means for bandpass filtering the IF signal and deriving the sound carrier modulated with audio information, said sound bandpass filter means consisting essentially of a single parallel resonant circuit tuned to the sound carrier frequency, a sound detector means coupled to both the video detector means and the sound bandpass filter means for mixing the second filtered version of the picture carrier received from the video detector means and the sound carrier modulated with audio information received from the sound bandpass filter, and producing an output signal comprising a sound intercarrier modulated with the audio information, the video bandpass filter means being common to both the video detector and the sound detector, a picture gain controllable amplifier for amplifying one of the IF signal and the first filtered version of the picture carrier modulated with video information, a sound gain controllable amplifier for amplifying the sound carrier modulated with audio information, and means responsive to the detected video signal for adjusting both the gain of the picture gain controllable amplifier and the gain of the sound gain controllable amplifier.

15. The television receiver of claim 14 wherein the level of the IF signal fed to the sound bandpass filter is attenuated by a signal attenuation means.

16. The television receiver of claim 15 wherein the signal attenuation means is a capacitor for loosely coupling the IF signal to the sound bandpass filter.

17. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

IF bandpass filter means for filtering said IF signal to produce a first filtered version of said picture carrier but still modulated by said video information, a video detector means having an input coupled to the IF bandpass filter means and including a video bandpass filter consisting essentially of a parallel resonant circuit tuned to the video carrier frequency and a limiter for deriving a second filtered version of the picture carrier from said first filtered version of said picture carrier relatively free of said video modulation for producing in response to said first and second filtered versions of said picture carrier a detected video signal, a sound bandpass filter means for bandpass filtering the IF signal and deriving the sound carrier modulated with audio information, and sound detector means coupled to both the video detector and the sound bandpass filter means for mixing the second filtered version of said picture carrier received from the video detector means and the sound carrier modulated with audio information received from the sound bandpass filter, and having an output comprising a sound intercarrier modulated with the audio information, the video bandpass filter being common to both the video detector and the sound detector.

18. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

IF bandpass filter means for filtering said IF signal to produce a first filtered version of said picture carrier but still modulated by said video information, a video detector means having an input coupled to the IF bandpass filter means and including a video bandpass filter means consisting essentially of a parallel resonant circuit tuned to the picture carrier frequency for deriving a second filtered version of the picture carrier from the first filtered version of said picture carrier relatively free of said video modulation, and a mixer for producing in response to said first and second filtered versions of said picture carrier a detected video signal, a sound bandpass filter means for bandpass filtering the IF signal and deriving the sound carrier modulated with audio information, the sound bandpass filter means exhibiting essentially a single resonant frequency at the sound carrier frequency, and a sound detector means coupled to both the video detector means and the sound bandpass filter means and including a mixer for mixing the second filtered version of the picture carrier received from the parallel resonant circuit of the video bandpass filter means and the sound carrier modulated with audio information received form the sound bandpass filter, and producing an output signal comprising a sound intercarrier modulated with the audio information, the parallel resonant circuit of the video bandpass filter means being common to the video detector means and the sound detector means.

* * * * *